United States Patent [19]

Johnson

[11] 4,325,115

[45] Apr. 13, 1982

[54] REGULATED DC POWER SUPPLY

[75] Inventor: Frederick O. Johnson, Monroeville, Pa.

[73] Assignee: Westinghouse Electric Corp., Pittsburgh, Pa.

[21] Appl. No.: 171,588

[22] Filed: Jul. 23, 1980

[51] Int. Cl.³ ............................................ H02M 7/155
[52] U.S. Cl. ........................................ 363/81; 363/54; 363/128; 318/61; 318/350
[58] Field of Search ........................... 363/50, 52–54, 363/79, 81, 84–85, 125, 128–129; 318/59, 61, 64, 66, 71, 345 R, 345 A, 345 C, 345 G, 350, 356, 399, 416, 423

[56] References Cited

U.S. PATENT DOCUMENTS

| | | | |
|---|---|---|---|
| 3,373,337 | 3/1968 | Hung | 363/54 |
| 3,564,365 | 2/1971 | Zelina | 363/81 |
| 3,743,908 | 7/1973 | Betke | 318/345 C |
| 3,789,280 | 1/1974 | Oldfield | 318/71 |
| 4,063,146 | 12/1977 | Oliver | 318/345 R |

*Primary Examiner*—William M. Shoop
*Assistant Examiner*—Peter S. Wong
*Attorney, Agent, or Firm*—Robert E. Converse, Jr.

[57] ABSTRACT

A regulated DC power supply has a converter having a plurality of switches which, upon proper regulation of their conduction, rectify an AC current. The converter produces a current feedback signal. A reference generator produces a plurality of adjustable reference signals each representative of one value of a load current and produces a predetermined, standby, reference signal representative of a standby load current. One of the adjustable reference signals, the standby reference signal, and the current feedback signal are added to produce a control signal. The control signal is compared to a signal representative of the AC source voltage. Firing signals, used to regulate the conduction of the switches, are produced in response to the existence of a predetermined relationship therebetween. In the event that all of the adjustable reference signals have a value of zero for a predetermined period of time, the firing signals will be inhibited from regulating the conduction of the switches.

17 Claims, 15 Drawing Figures

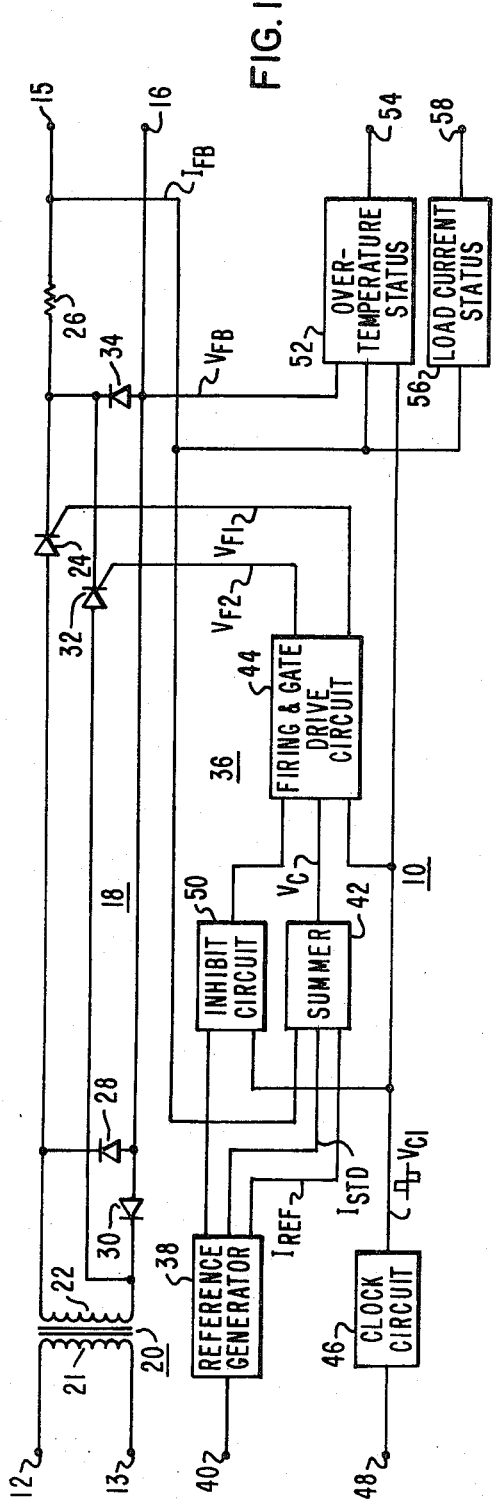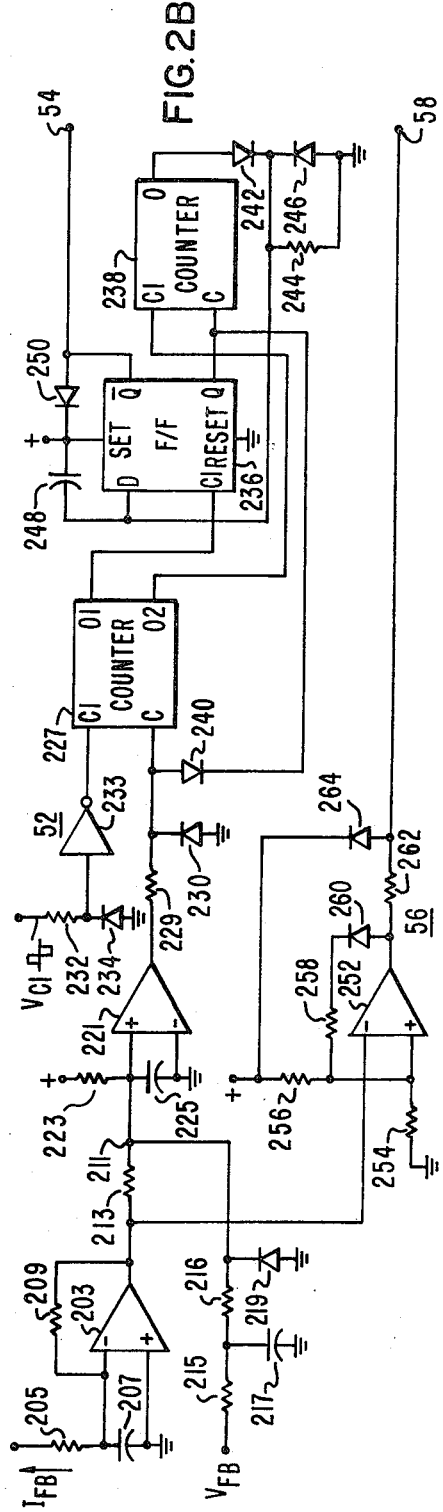

REGULATED DC POWER SUPPLY

BACKGROUND OF THE INVENTION

1. Field of the Invention

This invention is related generally to regulated DC power supplies and more specifically to the control circuit of such a power supply.

2. Description of the Prior Art

A power supply producing a regulated DC load current from an AC power source typically has a converter having input terminals adapted for connection to the AC source and output terminals adapted for connection to a load. The converter may be one of several conventional designs ranging from a three-phase converter to a singlephase semiconverter. Whichever design is chosen, the converter will have switches, such as silicon controlled rectifiers, which, upon proper regulation of when the switches are conductive, rectify the AC current thus providing the DC load, or output, current. The conduction of the switches is regulated by firing signals produced by a control circuit.

There are several known methods for producing the firing signals. They basically involve the production of a signal representative of the AC source, or input, voltage. This signal is compared with a reference signal and the firing signal is produced in response to a predetermined relationship existing therebetween. The user may effectively control the production of the firing signals by controlling the reference signal.

In one particular application the DC power supply is used to provide a DC load current to the stator winding of an elevator motor. In this application several reference signals are produced. A full field reference signal is representative of the load current used to overexcite the stator winding to produce the torque necessary to accelerate an elevator car. A running field reference signal is representative of the load current used to maintain the torque required to maintain the speed of the elevator car. Finally, a standby reference signal is representative of the load current used to maintain the field of the stator winding while the elevator car is not moving.

The full field, running field, and standby load currents are presently produced by an unregulated DC power supply and power resistors connected in series with the field winding. Power relays may be used to shunt some of the resistors thereby causing the value of the load current to change. Because of AC input voltage variations and changes in the field resistance due to temperature variations the power supply is unregulated. Without some type of feedback loop to compensate for these variations, the resulting load current will be unregulated.

The present invention eliminates the need for relays and allows operation over a wide range of input voltages. The present invention also provides a negative current feedback loop to regulate the load current. These and other features of the present invention are discussed in detail hereinbelow.

SUMMARY OF THE INVENTION

A regulated DC power supply producing adjustable levels of a DC load current has a pair of input terminals adapted for connection to a source of AC current and a pair of output terminals adapted for connection to a load. A converter is connected between the input and the output terminals. The converter has a plurality of switches which, upon proper regulation of their conduction, rectify the AC current. The converter also produces a current feedback signal.

A reference generator produces a plurality of adjustable reference signals each representative of one value of the load current. The reference generator also produces a predetermined, standby, reference signal representative of a standby load current. One of the adjustable reference signals, the standby reference signal, and the current feedback signal are added to produce a control signal. The reference generator and the production of the control signal are considered to be important features of the present invention.

A signal representative of the AC source voltage is compared with the control signal by a firing circuit. Firing signals, used to regulate the conduction of the switches, are produced in response to the existence of a predetermined relationship therebetween.

In the event that all of the adjustable reference signals have a value of zero for a predetermined period of time the firing signals will be inhibited from regulating the conduction of the switches. This is considered to be an important feature of the present invention.

BRIEF DESCRIPTION OF THE DRAWINGS

FIG. 1 is a block diagram of a regulated DC power supply constructed in accordance with the teachings of the present invention;

FIGS. 2A and 2B are an electrical schematic illustrating the circuit details of the regulated DC power supply of FIG. 1.

DESCRIPTION OF THE PREFERRED EMBODIMENT

Figure 2A:
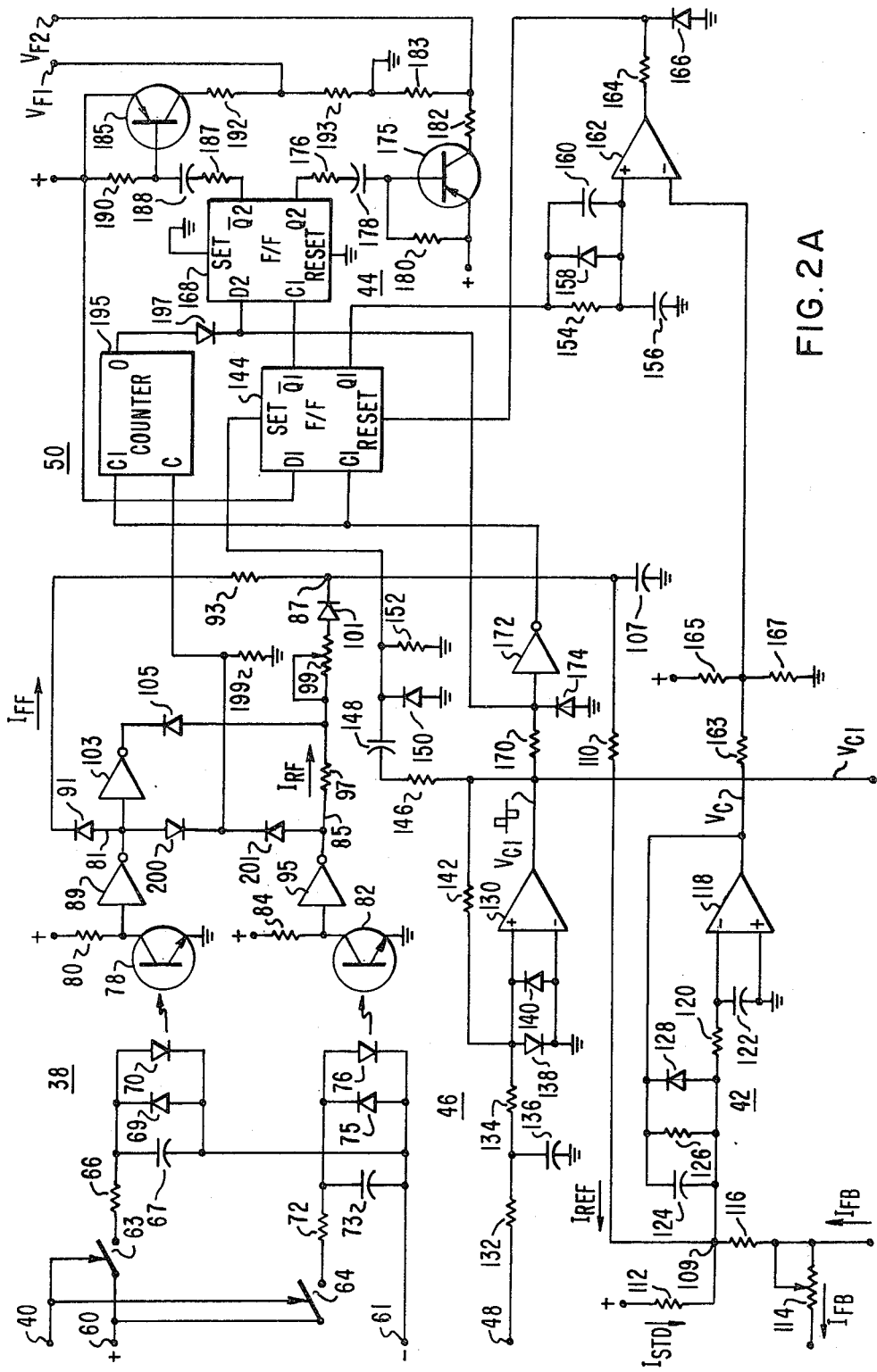

In FIG. 1, a block diagram of a regulated DC power supply 10 constructed in accordance with the teachings of the present invention is shown. The power supply 10 has a pair of input terminals 12 and 13 adapted for connection to a source of AC power and a pair of output terminals 15 and 16 adapted for connection to a load. A single-phase semiconverter 18 is connected between the input terminals 12 and 13 and the output terminals 15 and 16. The single-phase semiconverter 18 is not an important feature of the present invention and has been chosen for purposes of illustration only. It is to be understood that any of a number of conventional converter circuits may be connected between the input terminals 12 and 13 and the output terminals 15 and 16 of the power supply 10.

The single-phase semiconverter 18 has a transformer 20 having a primary winding 21 connected across the input terminals 12 and 13 of the power supply 10. The transformer 20 has a secondary winding 22 having a first end connected to the output terminal 15 through the series combination of a thyristor 24 and a resistor 26. The first end of the secondary winding 22 is also connected to the output terminal 16 through a diode 28. A second end of the secondary winding 22 is connected to the output terminal 16 through a diode 30. The second end of the secondary winding 22 is also connected to the junction between the thyristor 24 and the resistor 26 through a thyristor 32. The junction between the thyristor 24 and the resistor 26 is connected to the output terminal 16 through a diode 34. A current feedback signal $I_{FB}$ is available at the output terminal 15. A voltage feedback signal $V_{FB}$ is available at the output terminal 16. The remainder of the blocks in FIG. 1 make up a control circuit 36 which produces firing signals for regulating the conduction of the thyristors 24 and 32. The junction between the thyristor 24 and the resistor 26 is the ground or common reference for the control circuit 36.

The control circuit 36 has a reference generator 38 producing a plurality of adjustable reference signals $I_{Ref}$, each representative of one value of the load current, in response to an external control signal input to the reference generator at an input terminal 40. The reference generator 38 also produces a predetermined, standby, reference signal $I_{Std}$ representative of a standby load current. One of the adjustable reference signals $I_{Ref}$ and the standby reference signal $I_{Std}$ are input to a summer 42. The summer 42 also receives the current feedback signal $I_{FB}$ and produces a control signal $V_C$ in response to the addition of these signals. The control signal $V_C$ is input to a firing and gate drive circuit 44.

A clock circuit 46 receives a signal representative of the AC source voltage at an input terminal 48. The clock circuit produces a clock signal $V_{C1}$ which is input to the firing and gate drive circuit 44. The firing and gate drive circuit 44 produces firing signals $V_{F1}$ and $V_{F2}$ in response to both the control signal $V_C$ and the clock signal $V_{C1}$. The firing signal $V_{F1}$ regulates the conduction of the thyristor 24; the firing signal $V_{F2}$ regulates the conduction of the thyristor 32.

The control circuit 36 has an inhibit circuit 50 which prevents the firing signals $V_{F1}$ and $V_{F2}$ from regulating the conduction of the thyristors 24 and 32, respectively. This occurs when all of the plurality of adjustable reference signals $I_{Ref}$ have a value of zero for a predetermined period of time measured by counting the pulses of the clock signal $V_{C1}$. The control circuit 36 also has an over-temperature status circuit 52. The over-temperature status circuit 52 compares the voltage feedback signal $V_{FB}$ to the current feedback signal $I_{FB}$ and produces an overtemperature signal in response to the existence of a predetermined relationship therebetween for a given period of time measured by counting the pulses of the clock signal $V_{C1}$. The overtemperature signal is available at an output terminal 54. Finally, the control circuit 36 has a load current status circuit 56 which compares the current feedback signal $I_{FB}$ to a reference value. The load current status circuit 56 produces a load current status signal in response to the existence of a predetermined relationship therebetween. The load current status signal is available at an output terminal 58.

Turning now to FIGS. 2A and 2B, an electrical schematic illustrating the circuit details of the regulated DC power supply 10 of FIG. 1 is shown. The reference generator 38 is shown generally in the upper lefthand corner of FIG. 2A. The reference generator has a pair of input terminals 60 and 61 connected across an unregulated, low power, source of DC current. A pair of switches 63 and 64 determine which current path of the reference generator 38 will be energized. The switches 63 and 64 are controlled by the external control signal input to the terminal 40. When the switch 63 is closed, current flows through the series combination of a resistor 66 and a photodiode 70 connected across the input terminals 60 and 61. A diode 69 and a capacitor 67 are each connected in parallel across the photodiode 70. The diode 69 provides reverse voltage protection for the photodiode 70. The capacitor 67 provides a nominal amount of filtering. A light sensitive transistor 78, responsive to the photodiode 70, has an emitter terminal connected to ground and a collector terminal connected to a positive voltage source through a resistor 80. The collector current of the transistor 78 provides a logic zero to an inverter 89 when the transistor 78 is conductive. The inverter 89 provides a source of voltage for a first current path 81. Similarly, when the switch 64 is closed, current flows through the series combination of a resistor 72 and a photodiode 76 connected across the input terminals 60 and 61. A diode 75 and a capacitor 73 are each connected in parallel across the photodiode 76. A light sensitive transistor 82, responsive to the photodiode 76, has an emitter terminal connected to ground and a collector terminal connected to a positive voltage source through a resistor 84. The collector current of the transistor 82 provides a logic zero to an inverter 95 when the transistor 82 is conductive. The inverter 95 provides a source of voltage for a second current path 85. In this manner the unregulated, low power, DC source is optically coupled to the first and second current paths 81 and 85, respectively.

The first current path 81 is connected between an output terminal of the inverter 89 and a node 87 and is comprised of the series combination of a diode 91 and a resistor 93. The first current path 81 produces an adjustable reference signal when the switch 63 is closed. In the preferred embodiment wherein the load is a stator winding of an elevator motor, the adjustable reference signal produced by the first current path 81 is a full field reference signal $I_{FF}$ representative of the level of load current used during startup to overexcite the stator field thus causing an elevator car to accelerate.

The second current path 85 is connected between an output terminal of the inverter 95 and the node 87 and is comprised of the series combination of a resistor 97, an adjustable resistor 99, and a diode 101. The second current path 85 produces an adjustable reference signal when the switch 64 is closed. In the preferred embodiment the adjustable reference signal produced by the second current path 85 is a running field reference signal $I_{RF}$ representative of the load current used during normal operation to maintain the velocity of the elevator car. The junction between the inverter 89 and the diode 91 is connected to the junction between the resistor 97 and the adjustable resistor 99 through the series combination of an inverter 103 and a diode 105. The inverter 103 and diode 105 limit the value of the adjustable reference signal in the event that both switches 63 and 64 are closed. If both switches 63 and 64 are closed, the full field reference signal $I_{FF}$ dominates over the running field reference signal $I_{RF}$.

The node 87 is connected to ground through a capacitor 107. The node 87 is also connected to a summing junction 109 through a resistor 110. The current flowing from the node 87 into the summing junction 109 is the adjustable reference signal $I_{Ref}$ shown in FIG. 1. As discussed earlier, the adjustable reference signal $I_{Ref}$ may be either the full field reference signal $I_{FF}$ or the running field reference signal $I_{RF}$ depending upon which of the switches 63 or 64 is closed. The capacitor 107 prevents the adjustable reference signal $I_{Ref}$ from changing too quickly.

The reference generator 38 has a resistor 112 connected between a positive voltage and the summing junction 109. The standby reference signal $I_{Std}$ flows into the summing junction 109 through the resistor 112.

In the preferred embodiment the standby reference signal is representative of the load current used to energize the stator winding while the elevator car is not moving. The magnitude of the standby reference signal $I_{Std}$ is a fractional value of the magnitude of the full field reference signal such as approximately one-half the value of $I_{FF}$.

The summing junction 109 also receives the current feedback signal $I_{FB}$ through the series combination of an adjustable resistor 114 and a resistor 116. The adjustable resistor 114 may be adjusted by the user to determine the magnitude of the current feedback signal $I_{FB}$. The current feedback signal $I_{FB}$ has a negative value as indicated by the arrow in FIG. 2A. The summing junction 109 performs the function of the summer 42 shown in FIG. 1. The adjustable reference signal $I_{Ref}$, the standby reference signal $I_{Std}$ and the current feedback signal $I_{FB}$ are added at the summing junction 109.

The summing junction 109 is connected to an inverting input terminal of an operational amplifier 118 through a resistor 120. The inverting input terminal is connected to ground through a capacitor 122. A noninverting input terminal of the operational amplifier 118 is also connected to ground. An output terminal of the operational amplifier 118 is connected to the summing junction 109 through a capacitor 124, a resistor 126 and a diode 128, connected so as to provide three parallel paths. The operational amplifier 118 amplifies and filters the sum of the signals at the summing junction 109 producing the control signal $V_C$ which is available at the output terminal thereof. The amplifier 118 has a high DC voltage gain and a low AC voltage gain. The diode 128 limits the negative value of the DC voltage when the current feedback signal $I_{FB}$ has a value of zero.

Figure 3:
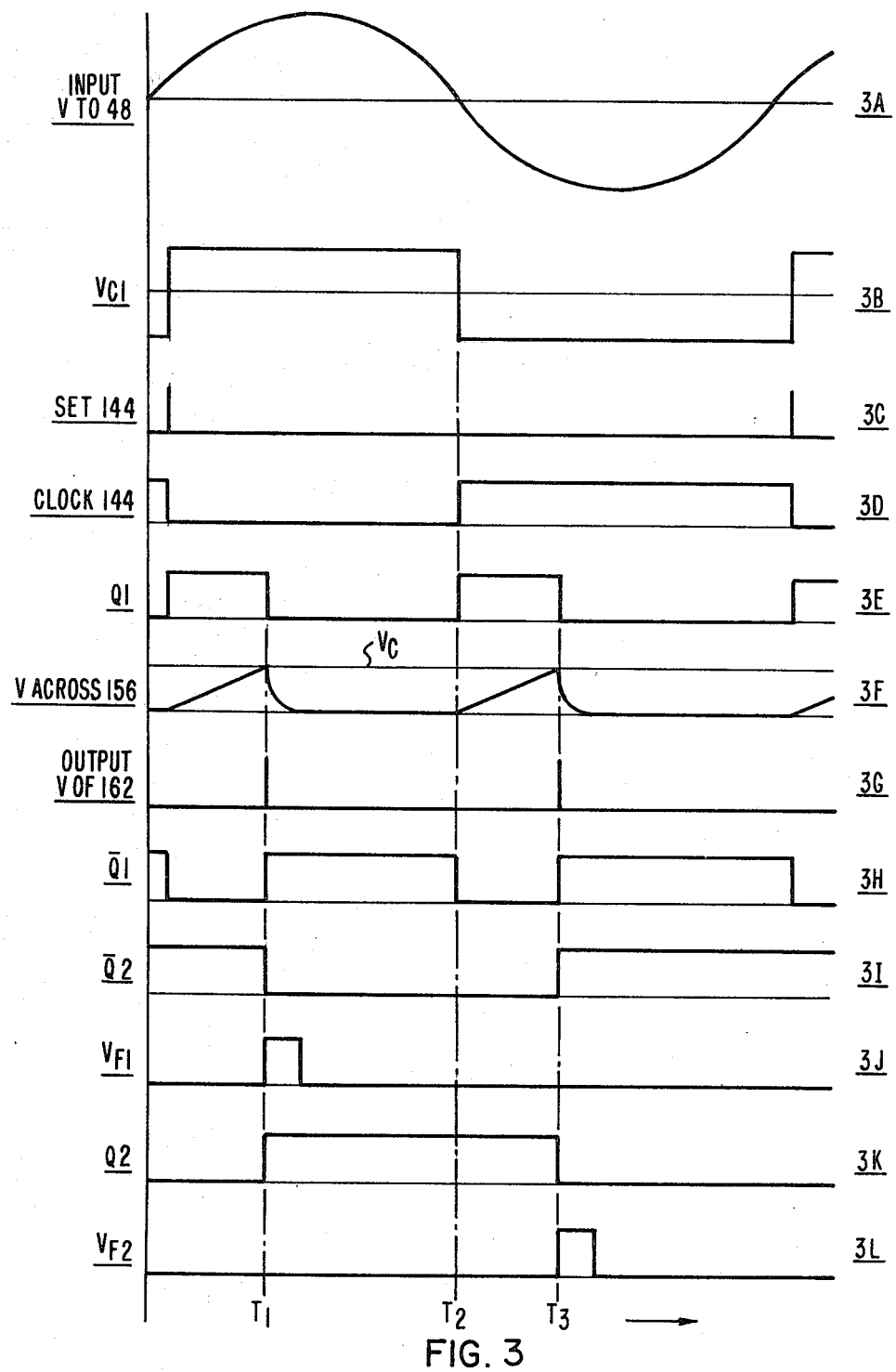
FIGS. 3A through 3L provide a timing diagram illustrating the interrelationships between the signals produced by the components of the firing and gate drive circuit.

The clock circuit 46 is found generally in FIG. 2A between the reference generator 38 and the summing junction 109. The AC signal representative of the AC source voltage input at the terminal 48 is input to a non-inverting input terminal of an operational amplifier 130 through the series combination of a resistor 132 and a resistor 134. The junction between the resistor 132 and the resistor 134 is connected to ground through a capacitor 136. The non-inverting input terminal is connected to ground through the parallel combination of a diode 138 and a diode 140. An inverting input terminal of the operational amplifier 130 is also connected to ground. An output terminal of the operational amplifier 130 is connected to the non-inverting input terminal thereof through a resistor 142. The clock signal $V_{C1}$ is available at the output terminal of the operational amplifier 130. Turning briefly to FIG. 3, the AC voltage input at the terminal 48 and the clock signal $V_{C1}$ are shown in FIGS. 3A and 3B, respectively.

The firing and gate drive circuit 44 is shown in detail in FIG. 2A. Although the firing and gate drive circuit 44 is not considered to be an important feature of the present invention, the circuit is described in detail since an understanding of the circuit is necessary in order to understand the operation of the inhibit circuit 50. Reference will be made to FIG. 3 where necessary to illustrate the signals produced by the components of the firing and gate drive circuit 44.

The clock signal $V_{C1}$ is input to a Set input terminal of a D-type flip-flop 144 through the series combination of a resistor 146 and a capacitor 148. The Set input terminal is connected to ground through the parallel combination of a diode 150 and a resistor 152. The resulting signal input to the Set terminal of the flip-flop 144 is shown in FIG. 3C. The pulses shown in FIG. 3C correspond to the positive going transitions of the clock signal $V_{C1}$.

The clock signal $V_{C1}$ is also input to a Clock input terminal of the flip-flop 144 through the series combination of a resistor 170 and an inverter 172. The junction between the resistor 170 and the inverter 172 is connected to ground through a diode 174. The resulting signal input to the Clock input terminal of the flip-flop 144 is shown in FIG. 3D. The pulses shown in FIG. 3D correspond to the negative going transitions of the clock signal $V_{C1}$. A D1 input terminal of the flip-flop 144 is connected to a positive voltage source.

A Q1 output terminal of the flip-flop 144 is connected to ground through the series combination of a resistor 154 and a capacitor 156. The junction between the resistor 154 and the capacitor 156 is connected to a non-inverting input terminal of an operational amplifier 162. The non-inverting input terminal of the operational amplifier 162 is connected to the Q1 output terminal of the flip-flop 144 through the parallel combination of a diode 158 and a capacitor 160. An inverting input terminal of the operational amplifier 162 is connected to the output terminal of the operational amplifier 118 through a resistor 163. The inverting input terminal of the operational amplifier 162 is connected to a positive voltage source through a resistor 165 and is connected to ground through a resistor 167. An output terminal of the operational amplifier 162 is connected to a Reset terminal of the flip-flop 144 through a resistor 164. The reset terminal of the flip-flop 144 is connected to ground through a diode 166. A $\overline{Q1}$ output terminal of the flip-flop 144 is connected to a Clock input terminal of a second D-type flip-flop 168. A D2 input terminal of the flip-flop 168 receives the clock signal $V_{C1}$ through the resistor 170. A Set input terminal and a Reset input terminal of the flip-flop 168 are both connected to ground.

When a pulse is received at the Set input terminal of the flip-flop 144 (see FIG. 3C), an output voltage at the output terminal Q1 changes from a low state to a high state as shown in FIG. 3E. When the voltage at the output terminal Q1 is high, the capacitor 156 begins to charge as shown in FIG. 3F. When the voltage across the capacitor 156 equals the voltage level of the control signal $V_C$ a voltage at the output terminal of the operational amplifier 162 changes from a low to a high state as shown at time $T_1$ in FIG. 3G. The output voltage of the operational amplifier 162 is input to the Reset input terminal of the flip-flop 144. The output voltage of the operational amplifier 162 causes the output voltage available at the Q1 terminal to change from a high to a low state thus discharging the capacitor 156 as shown in FIGS. 3E and 3F, respectively. With the voltage level of the capacitor 160 below the voltage level of the control signal $V_C$ the output voltage of the operational amplifier 162 returns to a low state. The output voltage of the operational amplifier 162 also causes the voltage available at the output terminal $\overline{Q1}$ of the flip-flop 144 to change from a low to a high state as shown in FIG. 3H. The voltage available at the output terminal $\overline{Q1}$ of the flip-flop 144 acts as a clock pulse for the flip-flop 168. When this pulse is received, and with the voltage at the D2 input terminal of the flip-flop 168 high because of the clock signal $V_{C1}$, shown in FIG. 3B, a voltage available at a $\overline{Q2}$ output terminal of the flip-flop 168 changes from a high to a low state as shown in FIG. 3I.

At time T2 a clock pulse is input to the Clock input terminal of the flip-flop 144 as shown in FIG. 3D. This clock pulse causes the voltage at the Q1 output terminal of the flip-flop 144 to change from a low to a high state, as shown in FIG. 3E, thus causing the capacitor 156 to charge again as shown in FIG. 3F. At time T3 the voltage across the capacitor 156 again equals the voltage level of the control signal $V_C$ such that the output voltage of the operational amplifier 162 changes from a low to a high state as shown in FIG. 3G. This output voltage resets the voltage available at the Q1 output terminal from a high to a low state causing the voltage across the capacitor 156 to decay which causes the output voltage of the operational amplifier 162 to change from a high to a low state as shown in FIGS. 3E, 3F and 3G, respectively. The voltage at the output terminal Q1 of the flip-flop 144 changes from a low to a high state which is input to the Clock input terminal of the flip-flop 168. When this pulse is received, and with the voltage at the D2 input terminal of the flip-flop 168 low, an output voltage available at a Q2 output terminal of the flip-flop 168 changes from a high to a low state as shown in FIG. 3K. The voltages available at the Q2 output terminal and the $\overline{Q2}$ output terminal of the flip-flop 168 are used to drive transistors to produce the firing signals as described hereinafter.

The Q2 output terminal of the flip-flop 168 is connected to a base terminal of a transistor 175 through the series combination of a resistor 176 and a capacitor 178. An emitter terminal of the transistor 175 is connected to the base terminal through a resistor 180 and is connected to a positive voltage source. A collector terminal of the transistor 175 is connected to ground through the series combination of a resistor 182 and a resistor 183. The transistor 175 is conductive for approximately one millisecond producing the firing signal $V_{F2}$, as shown in FIG. 3L, when the voltage available at the Q2 output terminal of the flip-flop 168 changes from a high to a low state. The firing signal $V_{F2}$ is available at the junction between the resistors 182 and 183 for regulating the conduction of the thyristor 32.

Similarly, the $\overline{Q2}$ output terminal of the flip-flop 168 is connected to a base terminal of a transistor 185 through the series combination of a resistor 187 and a capacitor 188. An emitter terminal of the transistor 185 is connected to the base terminal through a resistor 190 and is connected to a positive voltage source. A collector terminal of the transistor 185 is connected to ground through the series combination of a resistor 192 and a resistor 193. The transistor 185 is conductive for approximately one millisecond producing the firing signal $V_{F1}$, as shown in FIG. 3J, when the voltage available at the $\overline{Q2}$ output terminal of the flip-flop 168 changes from a high to a low state. The firing signal $V_{F1}$ is available at the junction between the resistors 192 and 193 for regulating the conduction of the thyristor 24. The production of the firing signals $V_{F1}$ and $V_{F2}$ may be advanced by lowering the voltage level of the control signal $V_C$ or delayed by raising the voltage level of the control signal.

The function provided by the inhibit circuit 50 of FIG. 1 is produced by a counter 195 shown in FIG. 2A. The counter 195 has an output terminal connected to the D2 input terminal of the flip-flop 168 through a diode 197. The counter 195 has a clock input terminal receiving the clock signal $V_{C1}$ through the series combination of the resistor 170 and the inverter 172. The counter 195 also has a control input terminal connected to ground through a resistor 199, connected to the junction between the inverters 89 and 103 through a diode 200 and connected to the junction between the inverter 95 and the resistor 97 through a diode 201. When either the first current path 81 or the second current path 85 is producing an adjustable reference signal, the resistor 199 will develop a voltage which is input to the control input terminal of the counter 195. This voltage, input at the control input terminal of the counter 195, prevents the counter from operating.

In the event that all of the adjustable reference signals have a value of zero, the voltage is removed from the control input terminal of the counter 195. When this voltage is removed, the counter begins to count the clock pulses input to the clock input terminal. When a predetermined period of time has elapsed, during which all of the adjustable reference signals continue to have a value of zero, a voltage available at the output terminal of the counter 195 changes from a low to a high state. This voltage inhibits the flip-flop 168 from its normal operation thus preventing the production of the firing signals $V_{F1}$ and $V_{F2}$. When an adjustable reference signal is again produced, the voltage across the resistor 199 will be input to the control input terminal of the counter 195 thus resetting the counter and again allowing normal operation of flip-flop 168. The operation of the counter 195 and the interrelationship it provides between the adjustable reference signals and the normal operation of the firing circuit is considered to be an important feature of the present invention.

Turning now to FIG. 2B, the current feedback signal $I_{FB}$ is input to an inverting input terminal of an operational amplifier 203 through a resistor 205. The inverting input terminal is connected to ground through a capacitor 207. A non-inverting input terminal of the operational amplifier 203 is connected to ground. An output terminal of the operational amplifier 203 is connected to the inverting input terminal thereof through a resistor 209. The current feedback signal $I_{FB}$ is amplified by the operational amplifier 203.

Turning to a description of the over-temperature status circuit 52, the amplified current feedback signal $I_{FB}$, available at the output terminal of the operational amplifier 203, is input to a summing junction 211 through a resistor 213. The summing junction also receives the voltage feedback signal $V_{FB}$ through the series combination of a resistor 215 and a resistor 216. The summing junction 211 is connected to ground through a diode 219. The junction between the resistors 215 and 216 is connected to ground through a capacitor 217. The capacitor filters the voltage feedback signal $V_{FB}$. The summing junction 211 is connected to a non-inverting input terminal of an operational amplifier 221. The non-inverting input terminal is connected to a positive voltage source through a resistor 223 and is connected to ground through a capacitor 225. An inverting input terminal of the operational amplifier 221 is connected to ground.

The output terminal of the operational amplifier 221 is connected to a control input terminal of a first counter 227 through a resistor 229. The control input terminal is also connected to ground through a diode 230. The counter 227 receives the clock signal $V_{C1}$ at a clock input terminal thereof through the series combination of a resistor 232 and an inverter 233. The junction between the resistor 232 and the inverter 233 is connected to ground through a diode 234. A first output terminal of the counter 227 is connected to a Clock input terminal of a flip-flop 236. A second output terminal of the counter 227 is connected to a clock input terminal of the second counter 238. A first output terminal of the second counter 238 is connected to a D input terminal of the flip-flop 236 through a diode 242.

The D input terminal of the flip-flop 236 is connected to ground through the parallel combination of a resistor 244 and a diode 246 and is connected to a positive voltage source through a capacitor 248. A Q output terminal of the flip-flop 236 is connected to a positive voltage source through a diode 250 and is connected to the output terminal 54. A $\overline{Q}$ output terminal of the flip-flop 236 is connected to the control input terminal of the second counter 238 and is connected to the control input terminal of the first counter 227 through a diode 240. A Set terminal and a Reset terminal of the flip-flop 236 are connected to a positive voltage source and ground, respectively. This concludes the description of the components of the over-temperature status circuit 52.

In operation, the over-temperature status circuit 52 receives the current feedback signal $I_{FB}$ at the summing junction 211. The current feedback signal has a negative value when initially received but is inverted by the operational amplifier 203 such that the signal received at the summing junction 211 is positive. The voltage feedback signal $V_{FB}$ is subtracted from the positive current feedback signal. So long as the voltage required to produce the load current is not excessive, the current feedback signal $I_{FB}$ will dominate and the voltage at the summing junction 211 will be positive. When the voltage at the summing junction 211 is positive, the voltage at the output terminal of the operational amplifier 221 is also positive, which prevents the counter 227 from counting. The voltage available at the output terminal of the operational amplifier 221 is an initial overtemperature signal. Should the voltage required to produce the load current become excessive, the voltage feedback signal $V_{FB}$ will dominate and the voltage at the summing junction 211 will be negative. In the preferred embodiment wherein the load is the stator winding of an elevator motor the voltage necessary to produce the load current will become excessive when the field temperature is greater than approximately 105° C.

When the voltage at the summing junction 211 is negative, the voltage at the output terminal of the operational amplifier 221 is negative which allows the counter 227 to begin counting the clock pulses input to the clock input terminal thereof. After a predetermined period of time, approximately eight seconds in this example, an output voltage at the first output terminal of the counter 227 will change from a low to a high state. This change in voltage is input to the Clock input terminal of the flip-flop 236 which causes the voltage at the $\overline{Q}$ output terminal to change from a low to a high state and causes the voltage at a Q output terminal to change from a high to a low state. The output voltage at the $\overline{Q}$ output terminal provides the over-temperature status signal available at the output terminal 54. The change in voltage at the Q output terminal is used to prevent the first counter 227 from being reset and to initiate counting by the second counter 238. The purpose of the first counter 227 is to require that the voltage feedback signal $V_{FB}$ dominate the current feedback signal $I_{FB}$ for a predetermined period of time to prevent spurious signals from producing a false over-temperature status signal.

The second counter 238 times out a predetermined time period, approximately 18.2 minutes in this example, by counting the clock pulses produces at the second output terminal of the counter 227. During this period the over-temperature status signal remains available at the output terminal 54 independently of the value of the initial over-temperature status signal. After the predetermined time period has elapsed a voltage available at the output terminal of the second counter 238 changes from a low to a high state which resets the flip-flop 236. When the flip-flop 236 is reset the voltage at the $\overline{Q}$ output terminal changes from a high to a low state and the voltage at the Q output terminal changes from a low to a high state. Thus, the over-temperature status signal is no longer available at the output terminal 54 and the counter 227 is again free to respond to the initial over-temperature signal produced by the operational amplifier 221. If after the 18.2 minute cooling off period the field voltage is still excessive, the voltage at the output terminal of the operational amplifier 221 will still be low and the counter 227 will begin to time out its predetermined time period and the process is repeated. The over-temperature status circuit is considered to be an important feature of the present invention.

It is to be noted that the length of the time periods timed out by the counters 227 and 238 are discretionary with the user. The time periods may be increased or decreased depending upon the user's application. Also, an additional resistor may be added in series with the resistor 215, or the resistance value of the resistor 215 may be decreased, to modify the trip characteristic and thus allow the load temperature to increase or decrease, respectively, without causing the production of the overtemperature status signal. In this manner, the over-temperature status circuit 52 may also be customized to compensate for the different field characteristics of different loads.

Finally, the load current status circuit 56 shown in FIG. 1 is shown in detail in FIG. 2B. The current feedback signal $I_{FB}$ is input to an inverting input terminal of an operational amplifier 252. A non-inverting input terminal of the operational amplifier 252 is connected to ground through a resistor 254, to a positive voltage source through a resistor 256 and is connected to an output terminal of the operational amplifier 252 through the series combination of a resistor 258 and a diode 260. The output terminal is connected to a positive voltage source through the series combination of a resistor 262 and a diode 264. The junction between the resistor 262 and the diode 264 is connected to the output terminal 58. The current feedback signal $I_{FB}$ is compared to a reference signal determined by the ratio of the resistors 256 and 254. When the current feedback signal exceeds this reference value, the load current status signal is available at the output terminal 58.

Briefly reviewing, a regulated DC power supply providing adjustable levels of a DC load current has a pair of input terminals adapted for connection to a source of AC current and a pair of output terminals adapted for connection to the stator winding of an elevator motor. A converter is connected between the input terminals and the output terminals. The converter has a plurality of switches which, upon proper regulation of their conduction, rectify the AC current. The converter produces a current feedback signal and a voltage feedback signal.

An important feature of the present invention is a reference generator which produces a plurality of adjustable reference signals and which produces a predetermined, standby, reference signal. In the preferred embodiment, the plurality of adjustable reference signals includes a full field reference signal representative of the load current used to accelerate an elevator car, and includes a running field reference signal representative of the load current used to maintain the velocity of the elevator car. The predetermined, standby, reference signal is representative of the load current used to energize the stator winding while the elevator car is not moving. One of the adjustable reference signals, the standby reference signal, and the current feedback signal are added to produce a control signal.

A firing circuit produces a signal representative of the AC source voltage. This signal is compared with the control signal and firing signals, used to regulate the conduction of the switches, are produced in response to the existence of a predetermined relationship therebetween. Another important feature of the present invention is an inhibit circuit. In the event that all of the adjustable reference signals have a value of zero for a predetermined period of time, the firing signals will be inhibited from regulating the conduction of the switches.

Another important feature of the present invention is an over-temperature status circuit which compares the voltage feedback signal to the current feedback signal. An over-temperature status signal is produced in response to a predetermined relationship existing therebetween.

Finally, the regulated DC power supply disclosed herein has a load current status circuit providing an output signal whenever the load current exceeds a predetermined value.

What is claimed is:

1. A regulated DC power supply producing adjustable levels of a DC load current, comprising:
    a pair of input terminals adapted for connection to a source of AC current;
    a pair of output terminals adapted for connection to a load;
    a converter connected between said input and said output terminals, said converter having a plurality of switches rectifying said AC current, said converter producing a current feedback signal;
    means producing a plurality of adjustable reference signals each representative of one value of the load current, said means producing a predetermined standby reference signal representative of a standby load current;
    means for adding said predetermined standby reference signal, one of said adjustable reference signals, and said current feedback signal, said adding means producing a control signal responsive to said addition;
    firing means producing firing signals regulating the conduction of said swtiches, said firing signals responsive to said control signal; and
    means inhibiting said firing signals from regulating the conduction of said switches when all of said adjustable reference signals have a value of zero for a predetermined period of time.

2. A regulated DC power supply of claim 1 wherein the adjustable reference signals include a full field reference signal representative of the level of the load current during startup, and includes a running field reference signal representative of the level of said load current during normal operation.

3. The regulated DC power supply of claim 2 wherein the predetermined standby reference signal has a value of one-half of the value of the full field reference signal.

4. The regulated DC power supply of claim 1 wherein the means producing the plurality of adjustable reference signals includes an unregulated source of DC power, a plurality of current paths each having resistors determining the value of the adjustable reference signal, and means for optically coupling said unregulated source of DC power to said current paths.

5. The regulated DC power supply of claim 4 including means interconnecting the plurality of current paths, said interconnecting means limiting the value of said adjustable reference signal.

6. The regulated DC power supply of claim 1 including means producing a clock signal, and wherein the means inhibiting the firing signals includes a counter responsive to said clock signal, said counter producing an inhibit signal after a predetermined period of time, measured from when all of the adjustable reference signals have a value of zero, has elapsed.

7. The regulated DC power supply of claim 1 including a second means for adding, and wherein the converter produces a voltage feedback signal, said second means adding said voltage feedback signal and the current feedback signal, said second means producing an initial over-temperature signal responsive to said addition.

8. The regulated DC power supply of claim 7 including means producing a clock signal, and including a counter responsive to both said clock signal and the initial over-temperature signal, said counter producing an over-temperature signal in response to the condition wherein said initial over-temperature signal has a predetermined magnitude for a predetermined period of time.

9. The regulated DC power supply of claim 8 including means for maintaining the over-temperature signal, said means responsive to the over-temperature signal and maintaining said over-temperature signal at an output terminal thereof for a predetermined period of time independently of the magnitude of the initial over-temperature.

10. The regulated DC power supply of claim 1 including means for comparing the current feedback signal to a reference value, said comparator means producing a load current status signal in response to the existence of a predetermined relationship therebetween.

11. A regulated DC power supply providing adjustable levels of a DC load current, comprising:
    a pair of input terminals adapted for connection to a source of AC current;
    a pair of output terminals adapted for connection to a stator winding of an elevator motor;
    a converter connected between said input and said output terminals, said converter having a plurality of switches rectifying said AC current, said converter producing a current feedback signal and a voltage feedback signal;
    means producing an adjustable full field reference signal representative of the load current used to accelerate an elevator car, said means producing an adjustable running field reference signal representative of said load current used to maintain the velocity of said elevator car, said means producing a predetermined standby reference signal representative of said load current used to energize said stator winding while said elevator car is not moving;

means for adding said predetermined standby reference signal, one of said adjustable reference signals, and said current feedback signal, said adding means producing a control signal responsive to said addition;

firing means producing a signal representative of the AC source voltage, said firing means producing firing signals regulating the conduction of said switches in response to the existence of a predetermined relationship between said signal representative of the AC source voltage and said control signal;

means inhibiting said firing signals from regulating the conduction of said switches when all of said adjustable reference signals have a value of zero for a predetermined period of time; and means adding said current feedback signal and said voltage feedback signal, said means producing an initial over-temperature signal responsive to said addition.

12. The regulated DC power supply of claim 11 wherein the predetermined standby reference signal has a value of one-half of the value of the full field reference signal.

13. The regulated DC power supply of claim 11 including means limiting the value of the adjustable reference signals.

14. The regulated DC power supply of claim 11 including means producing a clock signal, and wherein the means inhibiting the firing signals includes a counter responsive to said clock signal, said counter producing an inhibit signal after a predetermined period of time, measured from when both the full field reference signal and the running field reference signal have a value of zero, has elapsed.

15. The regulated DC power supply of claim 11 including means producing a clock signal, and including a counter responsive to both said clock signal and the initial over-temperature signal, said counter producing an over-temperature signal in response to the condition wherein said initial over-temperature signal has a predetermined magnitude for a predetermined period of time.

16. The regulated DC power supply of claim 15 including means for maintaining the over-temperature signal, said means responsive to the over-temperature signal and maintaining said over-temperature signal at an output terminal thereof for a predetermined period of time independently of the magnitude of the initial over-temperature signal.

17. The regulated DC power supply of claim 11 including means for comparing the current feedback signal to a reference value, said comparator means producing a load current status signal in response to the existence of a predetermined relationship therebetween.

* * * * *